United States Patent
Smyth et al.

(10) Patent No.: US 10,116,381 B1
(45) Date of Patent: Oct. 30, 2018

(54) SYSTEMS AND METHODS FOR FIXED SATELLITE SERVICE PROTECTION USING REAL-TIME MEASUREMENT

(71) Applicant: CABLE TELEVISION LABORATORIES, INC, Louisville, CO (US)

(72) Inventors: Peter Paul Smyth, Newbourne (GB); Jim O'Connor, Idaho Springs, CO (US); Lin Cheng, Superior, CO (US); Eric Winkelman, Boulder, CO (US)

(73) Assignee: Cable Television Laboratories, Inc, Louisville, CO (US)

( * ) Notice: Subject to any disclaimer, the term of this patent is extended or adjusted under 35 U.S.C. 154(b) by 0 days.

(21) Appl. No.: 15/809,658

(22) Filed: Nov. 10, 2017

Related U.S. Application Data

(60) Provisional application No. 62/420,124, filed on Nov. 10, 2016.

(51) Int. Cl.
| | |
|---|---|
| H04B 7/185 | (2006.01) |
| H04W 72/04 | (2009.01) |
| H04B 17/345 | (2015.01) |
| H04B 17/318 | (2015.01) |

(52) U.S. Cl.
CPC .... *H04B 7/18519* (2013.01); *H04W 72/0453* (2013.01); *H04B 17/318* (2015.01); *H04B 17/345* (2015.01)

(58) Field of Classification Search
CPC .............. H04B 7/18519; H04B 17/318; H04B 17/345; H04W 72/0453
See application file for complete search history.

(56) References Cited

U.S. PATENT DOCUMENTS

| | | | | |
|---|---|---|---|---|
| 6,433,685 | B1* | 8/2002 | Struble | B60R 25/00 340/426.28 |
| 7,492,283 | B1* | 2/2009 | Racunas, Jr. | G06Q 30/0284 235/378 |
| 9,524,628 | B1* | 12/2016 | Omer | G08B 13/2491 |
| 2005/0083843 | A1* | 4/2005 | Pinault | H04W 76/18 370/230 |
| 2006/0053057 | A1* | 3/2006 | Michael | G06Q 30/02 705/14.58 |
| 2007/0159971 | A1* | 7/2007 | Zhang | H04L 12/2898 370/230 |
| 2009/0322513 | A1* | 12/2009 | Hwang | A61B 5/02055 340/539.12 |
| 2010/0045510 | A1* | 2/2010 | Lopez | H01Q 1/1257 342/174 |
| 2010/0278064 | A1* | 11/2010 | Jeong | H04L 43/0829 370/252 |

(Continued)

*Primary Examiner* — Dominic Rego
(74) *Attorney, Agent, or Firm* — Armstrong Teasdale LLP

(57) ABSTRACT

A system for protecting a fixed satellite service site includes at least one earth station, a first beacon detector disposed within close proximity to the at least one earth station, a central server in operable communication with the fixed satellite service site and the first beacon detector, an access point configured to request authorization from the central server for resource allocation, and a beacon transmitter disposed within close proximity to the access point. The beacon transmitter is configured to transmit a beacon signal to one or more of the central server and the first beacon detector, and the beacon signal uniquely identifies the access point.

30 Claims, 6 Drawing Sheets

(56) References Cited

U.S. PATENT DOCUMENTS

| | | | |
|---|---|---|---|
| 2010/0306394 A1* | 12/2010 | Brown | H04L 63/0492 709/229 |
| 2011/0053605 A1* | 3/2011 | Carpio | G01S 5/0027 455/456.1 |
| 2012/0135758 A1* | 5/2012 | Cho | H04W 4/021 455/457 |
| 2012/0220307 A1* | 8/2012 | Wohlert | H04W 4/02 455/456.1 |
| 2013/0178232 A1* | 7/2013 | Claussen | G06Q 20/32 455/456.2 |
| 2015/0065166 A1* | 3/2015 | Ward | G01S 5/0205 455/456.1 |
| 2015/0245374 A1* | 8/2015 | Mitola | G06Q 30/08 370/329 |
| 2016/0169955 A1* | 6/2016 | Tsai | G06F 11/22 324/538 |
| 2016/0269137 A1* | 9/2016 | Lindoff | H04W 72/082 |
| 2017/0105094 A1* | 4/2017 | Kwak | H04W 4/023 |

\* cited by examiner

FIG. 3A (Prior Art)

| Azimuth angle (°) | Antenna gain 5° elevation angle (dB) | Total Attenuation required (dB) ||||
| --- | --- | --- | --- | --- | --- |
| | | Co-channel | LNB blocking | 1st adjacent OOBE | 2nd adjacent OOBE |
| 0 | 14.5 | 180.5 | 121.5 | 140.5 | 128.5 |
| 5 | -5.9 | 160.1 | 101.1 | 120.1 | 108.1 |
| 10 | -10.0 | 156.0 | 97.0 | 116.0 | 104.0 |
| 15 | -10.0 | 156.0 | 97.0 | 116.0 | 104.0 |

FIG. 3B (Prior Art)

Separation Distance with single Tx and 5° earth station antenna elevation angle (m)

| Azimuth angle (°) | Co-channel ||| LNB blocking ||| 1st adjacent OOBE ||| 2nd adjacent OOBE |||
| --- | --- | --- | --- | --- | --- | --- | --- | --- | --- | --- | --- | --- |
| | FSL | 231 Hata | 231 WI | FSL | 231 Hata | 231 WI | FSL | 231 Hata | 231 WI | FSL | 231 Hata | 231 WI |
| 0 | 6940000 | 3413 | 7370 | 7787 | 124 | 206 | 69400 | 360 | 653 | 17400 | 183 | 315 |
| 5 | 662800 | 1084 | 2140 | 744 | 39 | 60 | 6628 | 114 | 190 | 1660 | 58 | 92 |
| 10 | 413400 | 861 | 1670 | 464 | 31 | 47 | 4134 | 91 | 148 | 1040 | 46 | 71 |
| 15 | 413400 | 861 | 1670 | 464 | 31 | 47 | 4134 | 91 | 148 | 1040 | 46 | 71 |

SYSTEMS AND METHODS FOR FIXED SATELLITE SERVICE PROTECTION USING REAL-TIME MEASUREMENT

CROSS REFERENCE TO RELATED APPLICATIONS

This application claims the benefit of and priority to U.S. Provisional Patent Application Ser. No. 62/420,124, filed Nov. 10, 2016, which is incorporated herein by reference in its entirety.

BACKGROUND

The field of the disclosure relates generally to satellite service transmission systems, and particularly to management of fixed satellite service protection using real-time measurements.

Conventional fixed satellite service (FSS) earth stations, or sites, operate across a variety of spectrum bands for Geostationary Earth Orbit (GEO) satellites. The citizens band radio service (CBRS), defined by the FCC for fixed wireless and mobile communications operates in the 3550-3700 MHz (3.55-3.7 GHz) band and use of this spectrum is authorized and managed by a Spectrum Access System (SAS). The function of the SAS is to maintain a database of all transmitters that use the CBRS band, including the transmitter locations and transmitter powers. The SAS uses a propagation model to determine interference between each FSS site and radio access points (AP) to ensure globally across the totality of its management area that the interference is below an acceptable interference threshold at each location. The SAS uses frequency planning algorithms known in the field of cellular communications for Frequency Division Multiple Access (FDMA), such as GSM. Thus, the SAS is able to allocate to each AP or citizens broadband radio service device (CBSD), the frequency of operation, bandwidth, and transmitter power.

The C-band, which is designated by the IEEE and used for satellite communications, covers the 3-8 GHz band. The FSS incumbents in the 3.7-4.2 GHz of downlink C-band are identical in nature and technology to the FSS incumbents within the 3.55-3.7 GHz CBRS band, and these incumbents are provided co-channel and adjacent-channel protection (out of band) under the Part 96 rules of the United States Federal Communications Commission (FCC). Additionally, there is a requirement to limit the amount of aggregate interference across the entire downlink band to avoid gain compression at the Low Noise Amplifier (LNA) used for satellite signal reception. The 3.55-3.7 GHz for CBRS is considered fairly manageable at present due to the relatively small number of FSS sites (<100). In contrast, the 3.7-4.2 GHz band presently includes over 4700 registered FSS sites, and may include as many or more unregistered FSS sites.

There are approximately, at this time, 160 geostationary satellites utilizing the C-band for downlink in the 3.7-4.2 MHz spectrum. Each satellite typically employs 24 transponders, each with 36 MHz bandwidth. Carrier spacing is 40 MHz, 2×500 MHz used on each satellite, and 12 carriers each for horizontal and vertical polarization. The carrier-to-noise (C/N) margins are typically 2-4 dB. The earth stations typically employ multiple satellite dishes and frequency agile receivers to decode specific video/data streams off individual transponders. The actual received bandwidth at the FSS sites varies. Multiple dish antennas are often used to obtain programming from multiple satellites. The United States C-band frequency chart is shown below (in GHz) in Table 1.

TABLE 1

(Frequencies in GHz)

| Horizontal Uplink | Horizontal Downlink | Channel | Vertical Downlink | Vertical Uplink |
|---|---|---|---|---|
|  | 3.720 | 1 |  | 5.945 |
| 5.965 |  | 2 | 3.740 |  |
|  | 3.760 | 3 |  | 5.985 |
| 6.005 |  | 4 | 3.780 |  |
|  | 3.800 | 5 |  | 6.025 |
| 6.045 |  | 6 | 3.820 |  |
|  | 3.840 | 7 |  | 6.065 |
| 6.085 |  | 8 | 3.860 |  |
|  | 3.880 | 9 |  | 6.105 |
| 6.125 |  | 10 | 3.900 |  |
|  | 3.920 | 11 |  | 6.145 |
| 6.165 |  | 12 | 3.940 |  |
|  | 3.960 | 13 |  | 6.185 |
| 6.205 |  | 14 | 3.980 |  |
|  | 4.000 | 15 |  | 6.225 |
| 6.245 |  | 16 | 4.020 |  |
|  | 4.040 | 17 |  | 6.265 |
| 6.285 |  | 18 | 4.060 |  |
|  | 4.080 | 19 |  | 6.305 |
| 6.325 |  | 20 | 4.100 |  |
|  | 4.120 | 21 |  | 6.345 |
| 6.365 |  | 22 | 4.140 |  |
|  | 4.160 | 23 |  | 6.385 |
| 6.405 |  | 24 | 4.180 |  |

The C-band downlink spectrum includes 500 MHz adjacent to the CBRS band, but sharing this adjacent spectrum with mobile and fixed wireless usage has been problematic for technological reasons, and according to the existing protection rules, which are highly conservative in nature. Satellite receivers, for example, are extremely sensitive, having an interference threshold of −129 dBm/MHz according to the requirement from FCC Part 96, and operate below the thermal noise level of the actual band itself, often working with effective thermal noise of 80K, with high gain antennas (satellite dishes) to amplify a weak satellite signal before detection. Relatively small power transmitters sharing the same band may cause interference over distances of tens of kilometers or greater. There is no system currently in place to monitor and report operating parameters, such as the actual frequency channel usage or the direction and elevation of reception of the satellite dish with its dish size (which determines its gain for satellite reception) at each FSS site. Accordingly, the protection rules are conservative because existing SAS schemes have no capability to remedy interference. Furthermore, no conventional propagation models accurately predict the transmission loss between the transmitter and the receiver, or to the FSS site from the point of interference, which further encourages over protection of FSS sites from wireless transmitters that occupy the same band. Additionally, atmospheric effects can cause unpredictable propagation behavior, and FSS site operators may frequently change the FSS site operating parameters, which encourages the operators to register their respective FSS sites for full arc and full bandwidth protection when, in practice, the actual use may be much more restricted.

FIG. 1 is a schematic illustration of a conventional satellite service protection scheme 100 for an FSS site 102. FSS site 102 includes at least one earth satellite ground station 104, or earth station 104, which generally includes a dish and a frequency agile receiver (not separately numbered), for receiving and decoding video/data streams from satellite 106 (e.g., GEO C-band satellite). Protection scheme 100 further includes a CBSD 108, which may be a base station in the cellular context, such as an eNodeB for LTE, mounted on a vertical support or tower 110. CBSD 108 may be a radio access point (AP) used for fixed wireless access. Authorization and resource allocation of CBSD 108 is governed by an SAS 112, which is in operable communication with CBSD 108 over a data link 114 (e.g., wireless or wired Internet connection, etc.).

In operation of protection scheme 100, CBSD 108 requests authorization and resource allocation from SAS 112. SAS 112 has dynamic knowledge of the operating parameters of FSS site 102, which are communicated over a reporting link 115. Initially, the resource allocation to CBSD 108 can be provided using a propagation model to avoid interference. This interference modeling can model co-channel, adjacent channel, and aggregate interference. In this example, SAS 112 may use a frequency planning algorithm that is similar to a model used for cellular networks to determine the allocation of both frequency and power. However, this modeling technique is not aware of the actual loss between CBSD 108 and FSS site 102, which may include significant obstructions 116 (buildings, elevated ground, etc.) along an actual transmission path 118 therebetween. SAS 112 therefore implements protection scheme 100 according to an estimate model that utilizes a mapped distance 120 between CBSD 108 and FSS site 102 to predict a pass loss estimate.

However, because SAS 112 cannot measure the actual loss (in dB) along the actual transmission path 118, the path loss estimate will be inaccurate, and typically based on the worst-case scenario. Such inaccuracies therefore generally encourage over protection of the FSS sites and results in limited CBRS spectrum utilization. Accordingly, it would be desirable to develop an FSS protection scheme that can determine actual path loss considerations in real time to maximize use of available spectra, but without impairing the protection to the sensitive satellite receivers.

FIG. 2 is a schematic illustration of a conventional satellite service protection system 200 implementing protection scheme 100, FIG. 1, for earth station 104 receiving a video/data stream 202 from satellite 106. In this example, stream 202 has a total transmit spectrum of 500 MHz between 3700 MHz and 4200 MHz, that is, 500 MHz of the GEO C-band satellite downlink spectrum adjacent to the CBRS band. Under the current government rules, protection scheme 100 implements the FCC Part 96 protection scheme for 3600-3700 MHz earth stations. System 200 includes a low-noise block (LNB) 204 and a headend 206. LNB 204 includes, for example, a feed horn 208, a bandpass filter 210, and an LNA/downconverter 212. An FCC reference point (not shown), for interference calculations by the SAS, is generally taken between bandpass filter 210 and LNA 212. Headend 206 includes a plurality of channel receivers 214.

In operation of system 200, LNB 204 functions as the receiving device for the dish of earth station 104, collecting from the dish the amplified received radio waves as a block of frequency sub-blocks a through l (e.g., 12×40 MHz channels, see Table 1, above). LNB 204 amplifies and downconverts the collected block into a lower block of intermediate frequencies (IF) (e.g., 950-1450 MHz), which are then distributed as individual sub-blocks (c, f, b, i in this example) along a receiver signal distribution chain 216 to respective channel receivers 214, which are typically contained in a distribution rack in headend 206.

In this example, earth station 104 utilizes a 2-meter antenna, with protection of FSS LNB from gain compression of −60 dBm aggregate LNB input signal level from all CBRS emissions within 40 km across the 500 MHz band. Protection of FSS receiver noise floor is −129 dBm/MHz, as discussed above, from all co-channel CBRS signals within 150 km, based on maximum noise equal to −10 dB I/N, for 0.25 dB max noise rise at measurement point. FCC rules also specify the acceptable levels of adjacent channel interference in the first and second adjacent channels to that used for signal reception. The FCC Rules specify standard FSS dish gain profile (H and V planes) and also band pass filter attenuation. The antenna pattern (not shown) output from the dish is highly directional, the Half Power Beamwidth (HPBW) is approximately 5 degrees, and the front-to-back ratio is approximately 33 dB.

Conventionally, not all of the twelve 40 MHz channels (a through l) over one polarization (see Table 1, above) are actually demodulated along distribution chain 216 for a given FSS site (e.g., FSS site 102, FIG. 1, having 1-N earth stations 104). In the example illustrated in FIG. 2, only a third of the twelve polarization channels, are demodulated at headend 206, with protection scheme 100 requiring co-channel protection of an "unused" portion 218 of the transmit spectrum unavailable for use by other CBSDs 220 seeking authorization and resource allocation from SAS 112 for FSS site 102. That is, in this example, unused portion 218 represents 320 MHz of available terrestrial spectrum that is wasted and unusable under protection scheme 100.

FIGS. 3A-3B illustrate data tables 300, 302 for loss and separation distances according to the conventional protection scheme 100, FIG. 1, and system 200, FIG. 2. Tables 300 and 302 are each illustrated with respect to co-channel, LNB blocking, first adjacent out-of-band emission (OOBE) and second adjacent OOBE for a single interfering transmitter. In consideration of the loss values taken from table 300, minimum separation distances to reduce interference below the various thresholds in table 302 are determined using a free space path loss (FSL) equation and two common propagations models used for cellular communications: Cost 231 Hata (231 Hata), Cost 231 Walfish-Ikegami (231 WI). These tables illustrate the significant variations in associated protection distances depending on the model choice. For example, for an Azimuth of 0 degrees, a satellite dish elevation of 5 degrees and a satellite gain of 14.5 dB, the predicted separation distance is 6940 km for FSL, 7.4 km for 231 WI and 3.4 km for 231 Hata. Use of the most conservative model, FSL, will result in massive over protection of the FSS and under-utilization of the spectrum. In the example illustrated, the dish size is 2 m, antenna height of FSS is 4 m, and small cell height is 1.5 m. As can be seen from these examples, the FSL calculation is not able to take into account actual terrain/obstacle considerations. Even the use of other models such as 231 Hata and 231 WL require the choice of parameters that reflect different terrains profiles and even these can produce significant variations within themselves based on that choice.

BRIEF SUMMARY

In an aspect, a system is provided for protecting a fixed satellite service site. The system includes at least one earth station, a first beacon detector disposed within close proximity to the at least one earth station, a central server in operable communication with the fixed satellite service site and the first beacon detector, an access point configured to request authorization from the central server for resource allocation, and a beacon transmitter disposed within close proximity to the access point. The beacon transmitter is configured to transmit a beacon signal to one or more of the central server and the first beacon detector, and the beacon signal uniquely identifies the access point.

In another aspect, a method is provided for authorizing an access point to transmit within a spectrum occupied by a fixed satellite service site. The method includes steps of receiving, over a communication channel, an application from the access point to operate within the spectrum, calculating a path loss based on the application from the access point, determining that interference will be caused by transmission of the access point at a first frequency and a first power level, instructing the access point to transmit a beacon signal to one or more beacon detectors within range of the access point, measuring a path loss between the access point and the fixed satellite service site based on reported information from the one or more beacon detectors, assigning to the access point, based on the measured path loss, a second frequency within the spectrum and a second power level that do not cause substantial interference to the fixed satellite service site, and authorizing the access point to transmit at the second frequency and the second power level.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 3A-3B illustrate data tables for gain and separation distances according to the conventional protection scheme depicted in FIG. 1 and system depicted in FIG. 2.

Figure 1:
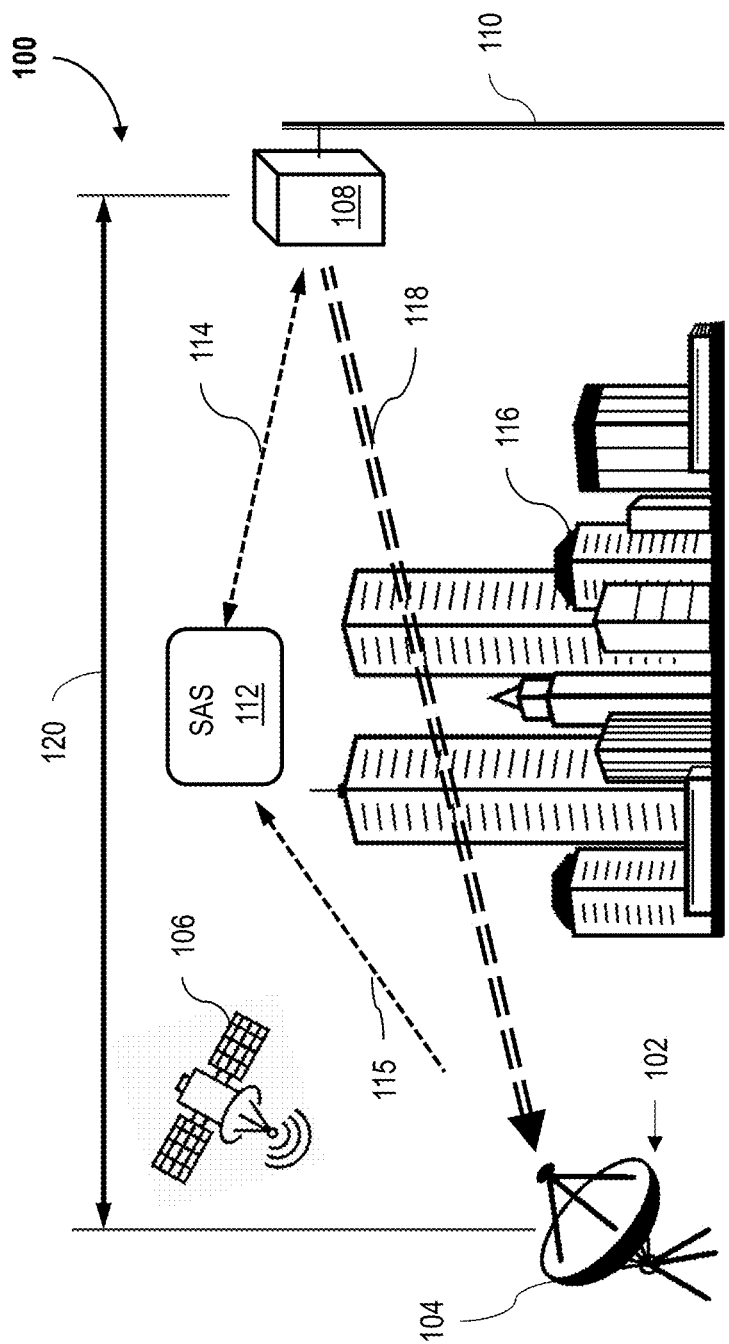
FIG. 1 is a schematic illustration of a conventional satellite service protection scheme according to an estimate model.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide systems and methods that introduce transmitter beacons and beacon detectors into an SAS or central server system to create a closed loop system that produces no significant interference to sensitive satellite receivers. The present embodiments implement actual real-time measurements, that is, a measurement-based protection (MBP) system, where each transmitter beacon is assigned its own unique identifier (ID) such that beacon detectors may be used to build an accurate and up-to-date propagation map or model. The MBP systems described herein further serve a dual purpose of allowing a central server to remedy the system in the event of a systematic change or actual interference experienced. In such cases, the MBP system utilizes the beacon transmitters and detectors to trace back to the source of the interference, and then affect system changes to protect particular FSS sites from the encountered interference.

In some embodiments, the techniques of the MBP system are extended to improve or calibrate to the propagation model that may be used to initially assign resources to a new access point (AP). The MBP system may, in such circumstances, implement the techniques such that the beacon transmitters transmit periodically to be received by one or more beacon detectors within the transmission proximity. Such a management system is thus a dynamically adaptable to changes in the environment of the transmission path. For example, the MBP system would know, in real-time, the effect on the path loss from a sufficiently tall building being built (or removed) between the beacon transmitter and detector, and use this real-time measurement to more accurately utilize the transmission spectrum then can be done under the conventional approach that only performs estimate calculations based on maps. Furthermore, the MBP system is capable of adapting to seasonal changes between spring and fail to take into account the differences in propagation through trees, which is a major limitation of conventional propagation tools.

More specifically, the present MBP system improves over conventional CBSD to CBSD protection, e.g., in the priority access license (PAL) and general authorized access license (GAA) sub-bands, by using the actual path loss measurements from the CBSD, instead of relying on propagation models, which are imprecise in the CBRS band 3.55-3.7 GHz, as well as other frequencies, generally due to clutter effects and building penetration loss as well as real time changes to the environment.

Because the MBP system of the present embodiments is implemented as a closed loop, and thus creates effectively zero interference (i.e., interference which has no meaningful effect on the satellite reception itself), the system is not limited to only CBSDs, but may also be applied with respect to APs and user equipment (UE/UEs) for mobile usage and small cell configurations. In an exemplary embodiment, individual beacon transmitters are configured to operate below the satellite noise floor, thereby allowing for significant link budget extension through a wide deployment of beacon transmitters and detectors.

Accordingly, the present systems and methods acknowledge the appropriate purpose of the incumbent protection requirements of Part 96, and propose an alternative solution that implements an MBP scheme that achieves the same protection goals for FSS sites, but without over-protecting the FSS sites. The present MBP schemes may assume that all of the 575 MHz C-band downlink FSS bandwidth is co-channel to CBRS at every earth station site, or alternatively may, in an intelligent fashion, be further configured to consider co-channel, adjacent channel, and aggregate interference limits to optimally use the spectrum. The conventional use of the conservative path loss predictions, while achieving the stated protection goals, unfortunately locks out CBRS usage by large geographic areas and results in inefficient use of the spectrum. In comparison, the present MBP schemes achieve the same protection goals, but also allow for control of spectrum reuse in a deterministic and non-interfering manner maximizing the spectrum utility. The present MBP systems and techniques further provide FSS receiver bandwidth usage reporting to a central server database (e.g., such as the SAS), which enables the central server to enforce FCC requirements without over-protecting (i.e., locking out usable spectrum). Additionally, the MBP embodiments presented herein have more general applications across other bands and systems, and will result in a dramatic improvement of spectrum efficiency throughout.

The present MBP system and methods herein thus implement an empirical measurement scheme that improves over conventional CBSD-to-CBSD protection schemes and resource assignment calculations, which results in increased spectral efficiency, while more effectively managing potential interference to the FSS site from individual mobile transmitters or radio access points and devices (e.g., UEs) associated with respective APs. Through these innovative and advantageous techniques, the central server is further able to remedy a situation where interference may be encountered, for example, by instructing an eNodeB or AP to change its frequency channel, and through these changes, associated connected devices as well, to avoid interference. These remedying techniques may therefore be extended to Macro-cells that share the same spectrum.

The present embodiments are further advantageously applicable to operation within other frequency bands, where radio spectrum sharing could be controlled and/or managed by a central server using various sharing strategies to allow multiple radio transceivers to coexist with each other and other non-controlled services (FSS in this example) that receive noise floor protection and front end blocking protection. These techniques are described more specifically below with respect to the following drawings.

Figure 4:
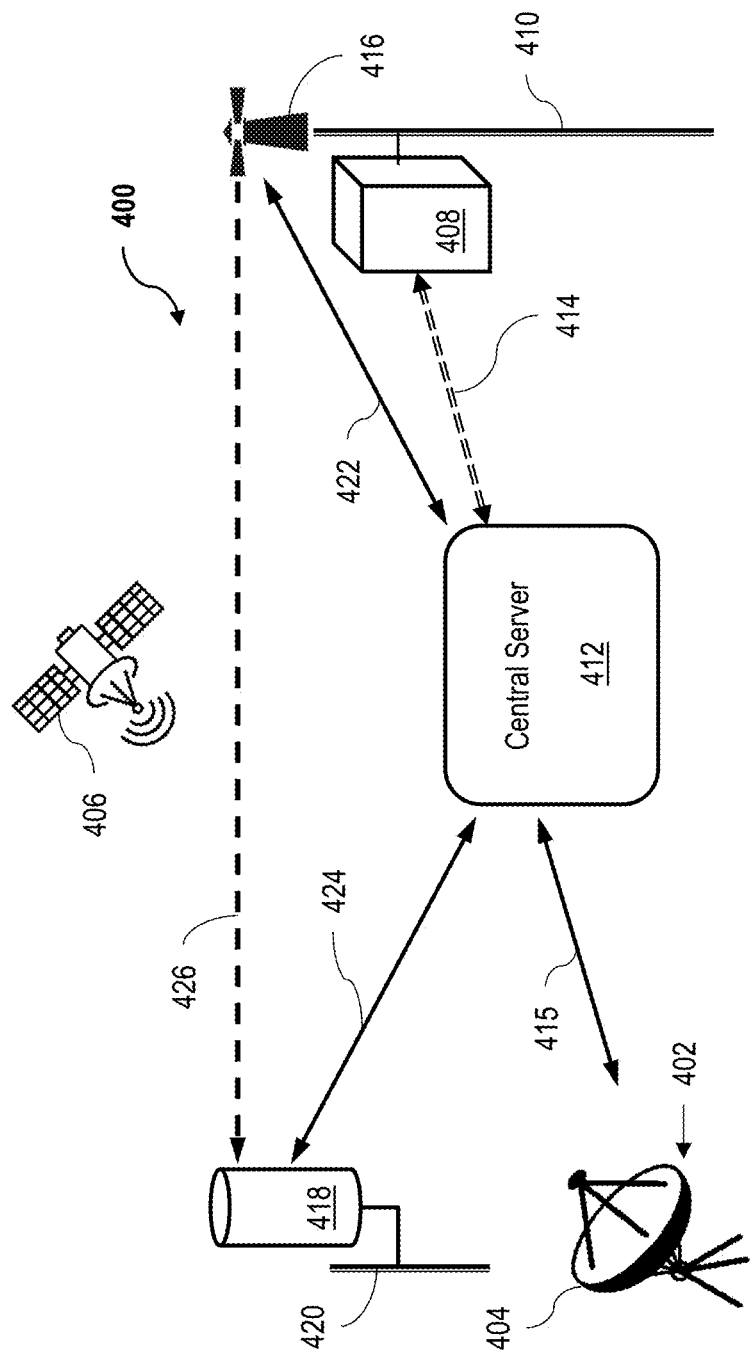
FIG. 4 is a schematic illustration of a satellite service protection scheme, according to an embodiment.

FIG. 4 is a schematic illustration of a satellite service protection scheme 400. In an exemplary embodiment, scheme 400 includes an FSS site 402 including at least one earth station 404, having a dish and a frequency agile receiver (not numbered), for receiving and decoding video/data streams from a satellite 406 (e.g., GEO C-band satellite). Scheme 400 further includes at least one AP 408. AP 408 may include, without limitation one or more of a wireless AP, an eNodeB, a base station, a CBSD, or a transceiver. In the exemplary embodiment, AP 408 is mounted on a first support 410. However, many APs are within buildings. The MBP capabilities of scheme 400 though, would take into account the penetrations loss of walls and metalized windows.

Authorization and resource allocation of FSS site 402 is governed by a central server 412. In some embodiments, central server 412 includes an SAS, and is in operable communication with AP 408 over an AP data link 414. Additionally, and FSS reporting link 415 communicates the operating parameters of FSS site 402, including without limitation, coordinate, elevation, azimuth angle, elevation angle, receiving channel(s), satellite arc(s), frequency range, receiving channels, antenna model, antenna height, antenna gain, feed horn model(s), LNB model(s), service designator(s), operation status of the FSS earth station.

Scheme 400 also includes at least one beacon transmitter 416 and at least one beacon detector 418. In the exemplary embodiment, beacon transmitter 416 is disposed in close proximity to AP 408, such as on first support 410, or alternatively as an integral component or function of AP 408. Similarly, beacon detector 418 is disposed within FSS site 402, in close proximity to earth station 404, and may be structurally mounted on the dish/antenna thereof, or alternatively on an independent second support 420, or alternatively as an integral component of FSS site 402. In some embodiments, each AP 408 includes at least one beacon transmitter 416, and each earth FSS site includes at least one beacon detector 418. In the exemplary embodiment, beacon transmitter 416 includes at least one transmitter, or alternatively, at least one transmitter and at least one receiver (not shown). Beacon detector 418 includes at least one receiving portion. In some embodiments, beacon transmitter 416 and beacon detector 418 includes transceivers.

Beacon transmitter 416 is in operable communication with central server 412 over a beacon data link 422, and beacon detector 418 is in operable communication with central server 412 over a beacon measurement reporting link 424. In an embodiment, beacon detector 418 is located outdoors, using a dedicated antenna (not separately shown). In another embodiment, beacon detector 418 is inserted in the post-LNB signal chain (described further below with respect to FIG. 5). In some embodiments, beacon detector 418 may be located outdoors and attached to the station 404. Beacon detector 418 may separately communicate directly with central server 412.

Beacon detector 418 is configured to receive a direct beacon signal 426 from beacon transmitter 416. Beacon detector 418 may be integrated within the system of FSS site 402 or implemented as a standalone system. In the exemplary embodiment, direct beacon signal 426 constitutes an in-band beacon RF signal including a unique ID, and is transmitted at a power that would not by itself cause any meaningful interference to FSS site 402. Beacon signal 426 may be transmitted on either an on-demand or a periodic basis. In other embodiments, the beacon can transmit the unique ID, its location, and its transmitter power, but is not limited to these parameters. In the exemplary embodiment, the location, frequency of operation, transmitter power, etc. are communicated by over data link 422 to minimize the range of detection. Beacon transmitter 416 is further configured to have its own unique ID that can be registered with a database (not shown in FIG. 4) of central server 412. Accordingly, in the case where AP 408 is a source of potential interference, central server 412 is capable of not only foreseeing or detecting the interference, but also of associating the foreseen or detected interference with the potential interference source (AP 408 in this example) through the unique ID. Moreover, by being able to identify the source of potential interference, central server 412 may be further configured to remedy the foreseen or encountered interference by, for example, instructing the interfering device to change its transmission channel and/or lower its transmission power or cease operation.

According to the exemplary embodiment illustrated in FIG. 4, the in-band transmission from beacon transmitter 416 allows measurement by central server 412 of the actual path loss between AP 408 and FSS site 402. In an embodiment, beacon detector is further configured to include a means of measuring the signal of the interference and reporting the measured signal to central server 412 for calculation of the link loss. Furthermore, in contrast with FIG. 1, FIG. 4 does not illustrate obstructions, because the presence or absence of obstructions between AP 408 and FSS site 402 is rendered irrelevant (for path loss determination purposes) by the nature of real-time measurements. This MBP scheme is advantageously applicable to interference calculations performed by central server 412.

In an exemplary embodiment, central server 412 further utilizes known locations (e.g., in the form of coordinates including longitude, latitude, and elevation) of both FSS site 402 and AP 408, as well as the transmit power and antenna pointing angles, to calculate the specific protection/protection scheme for FSS site 402 with respect to AP 408. In some embodiments, the protection scheme implemented by central server 412 further utilizes a path loss equation that utilizes empirical measurement data from one or more beacon detectors 418 (i.e., upon validation of the equation by the FCC and/or other relevant governing bodies). Central server 412 effectively implements the FCC protection requirements and, according to the embodiments herein, such FCC protection requirements may be advantageously changed, for example, if the protection criteria was deemed to be more or less conservative by itself.

In the exemplary embodiment, transmissions from beacon transmitter 416 (i.e., over links 422, 426) include the unique ID of the transmitter, as well as the transmit power of beacon transmitter 416 itself. Optionally, beacon transmitter 416 further transmits location information (e.g., GPS data and/or map data), and or one or more UEs associated with AP 408. Under this optional configuration, central server 412 may be further configured to manage not only potential interference from AP 408, but additionally potential UE interference along with consideration of the measured path loss. In an embodiment, the actual path loss is determined by central server 412 using an in-band measurement of beacon RSSI, and in further consideration of the transmitted effective isotropic radiated power (EIRP), as well as a measured antenna gain at one or both of AP 408 and earth station 404. Central server 412 may then assign AP resources according to any and all of these measured parameters.

In further operation, a wide-scale deployment of beacon detectors 418 at existing registered and unregistered FSS sites 402 (estimated at 8,000-10,000 sites or more at present) will provide a significant quantity of real-time information about each transmitting AP 408, and their respective effects on individual earth stations 404. The amount of information is considerable that can be collected from thousands of beacon detectors (each having, for example, a range of approximately 5 km), in a broad deployment at thousands of FSS sites, which are much more highly concentrated in heavily populated areas. The beacon-based MBP protection scheme of scheme 400 thus realizes a two-fold advantage over conventional protection schemes: (1) individual beacon transmitters 416 may be configured to identify themselves to other devices within range, thereby allowing other system elements to carry out measurements and build propagation maps; and (2) in the event of a systematic change or an emerging problem, central server 412 may be configured to utilize the unique beacon IDs to trace back to the source of actual interference and implement remedial measures. In the exemplary embodiment, individual beacon transmitters 416 transmit to other transceivers (e.g., beacon detectors 418, central server 412, other beacon transmitters 418 having a receiver component) within range, and feed the signal strength back to a centralized database (not shown in FIG. 4) of central server 412 (e.g., an SAS).

The MBP scheme of scheme 400 realizes still further advantages over conventional protection schemes that utilize path estimates based on locational maps and propagation models. Conventional CBSDs and APs are known to include GPS capability for an SAS to determine their respective locations on the map. Propagation models built by the conventional SAS, however, must make a number of numerical assumptions (e.g., effects from building heights, number of windows, building materials, effects of trees, contours of the path, general clutter, etc.) to calculate a path loss estimate between the transmitter and the FSS site. According to scheme 400 though, which performs real-time measurements, the propagation model may be dynamically built by central server 412 from empirical data, and updated in a timely manner based on actual system conditions.

In one exemplary operation, scheme 400 implements an MBP protection scheme that initially utilizes the conventional estimated propagation maps. That is, central server 412 may initially operate by performing calculations using estimated propagation maps to determine appropriate frequencies and power levels for individual APs 408. Over time though, as empirical data is collected from beacon transmitters 416 and beacon detectors 418. Such real-time measurements of power and operating conditions may be fed back to central server 412 to update the initial calculations in order to more accurately assign (and reassign) resources under optimum conditions. Central server 412 is then able to become aware of potential interference in real-time, and take remedial measures to resolve such problems, as described above.

In this example, beacon transmitters 416 will be in close proximity to the channel on which transmission is sought, and centralized server 412 may initially instruct AP 408 to operate at a particular frequency and power level. However, before an individual AP broadcasts across the entire band, AP 408 may first cause a beacon transmitter 416, in close proximity to the particular band, to transmit a beacon signal, which may be within the band itself, or in an adjacent guard band. Thus, by initiating transmission from beacon transmitter 416 prior to broadcast from AP 408, central server 412 is able to detect the beginning, learn the properties of the associated AP 408, and determine whether operation of AP 408 would cause interference with respect to a particular FSS site 402.

In the case where central server 412 determines that a particular AP 408 will cause interference, central server 412 may be further configured to instruct AP 408 to lower its power, operate on a different channel, or simply deny authorization and hence operation. In at least one example, central server 412 may reevaluate the beacon power level and determine that the level is sufficiently low enough to allow operation. Because scheme 400 continually receives beacon signal information, if AP 408 is allowed to broadcast but nevertheless causes interference, central server 412 is capable of correcting such a situation in a timely manner. In some embodiments, the band gaps between channels may be utilized in the MBP scheme of scheme 400. Because the transmitted signal of the beacon itself does not cause interference to satellite reception, the beacon signal and the transmitter IDs may be transmitted in any of the channels (12 in this example) of the transmit spectrum. The ID of a particular beacon transmitter 416 always stays the same, and therefore multiple beacons can overlap with other beacons within the same range, and still be decodable by central server 412, even in the case where two different beacons transmit within the same band gap.

According to the exemplary scheme 400, the transmitted beacon signal itself may constitute low spectrum noise density in the C-band, may be spread across the whole of the band, or may be a narrow-band signal (e.g., noise) of the order of about 10-1000 Hz. By itself, this spectrum density—even across the whole of the video channel—is not sufficiently high to cause any interference. According to exemplary scheme 400, the beacon is transmitted in a guard band. The beacon signal is though, sufficiently high that it may be actually measured, i.e., detected, by beacon detectors 418 and the information fed back to central server 412.

Scheme 400 is therefore configured to operate in multiple stages. In an initial stage, AP 408 requests authorization from central server 412, and central server calculates, by an initial propagation model or actual measurements, a safe frequency and power for AP 408 to transmit. In a second stage, beacon transmitter 416 transmits a modulated signal to beacon detector 418, which may be then used by central server 412 to determine whether the amplitude will create interference. As discussed above, when the beacon signal is transmitted within the channel itself or in a guard band, there is no interference to satellite reception. The beacons' spectral power density operates below the thermal noise level for the band itself. Furthermore, in the case where the beacon signal is out of band, or within band gaps, scheme 400 would be even more tolerant of the beacon, and may increase the beacon transmit power, and thereby potentially the beacon range as well. In a third stage, central server 412 determines that there is no interference, and informs AP 408 of the available resources for the broadcast. In the case where initial stages are based on propagation model estimates, subsequent real-time measurements by scheme 400 are utilized in later stages to dynamically manage AP 408.

According to the advantageous system and protection scheme of scheme 400, the highly conservative safety margins that are built into the conventional protection schemes may be avoided, because scheme 400 is able to remedy interference that is encountered within the conventional safety margins. Scheme 400 is capable of registering the beacons and control the associated AP transmission through the system-wide capability of beacon self-detection. Scheme 400 thus effectively functions as a closed-loop system that continually measures, updates, and controls broadcasting APs. Because the beacon deployment according to scheme 400 allows for sufficiently fast communication and control measures, central server 412 is further configured to sum measured interference to almost zero, thus effectively providing no significant interference. Conventional protection schemes have not considered such a zero-interference closed-loop system.

Figure 5:
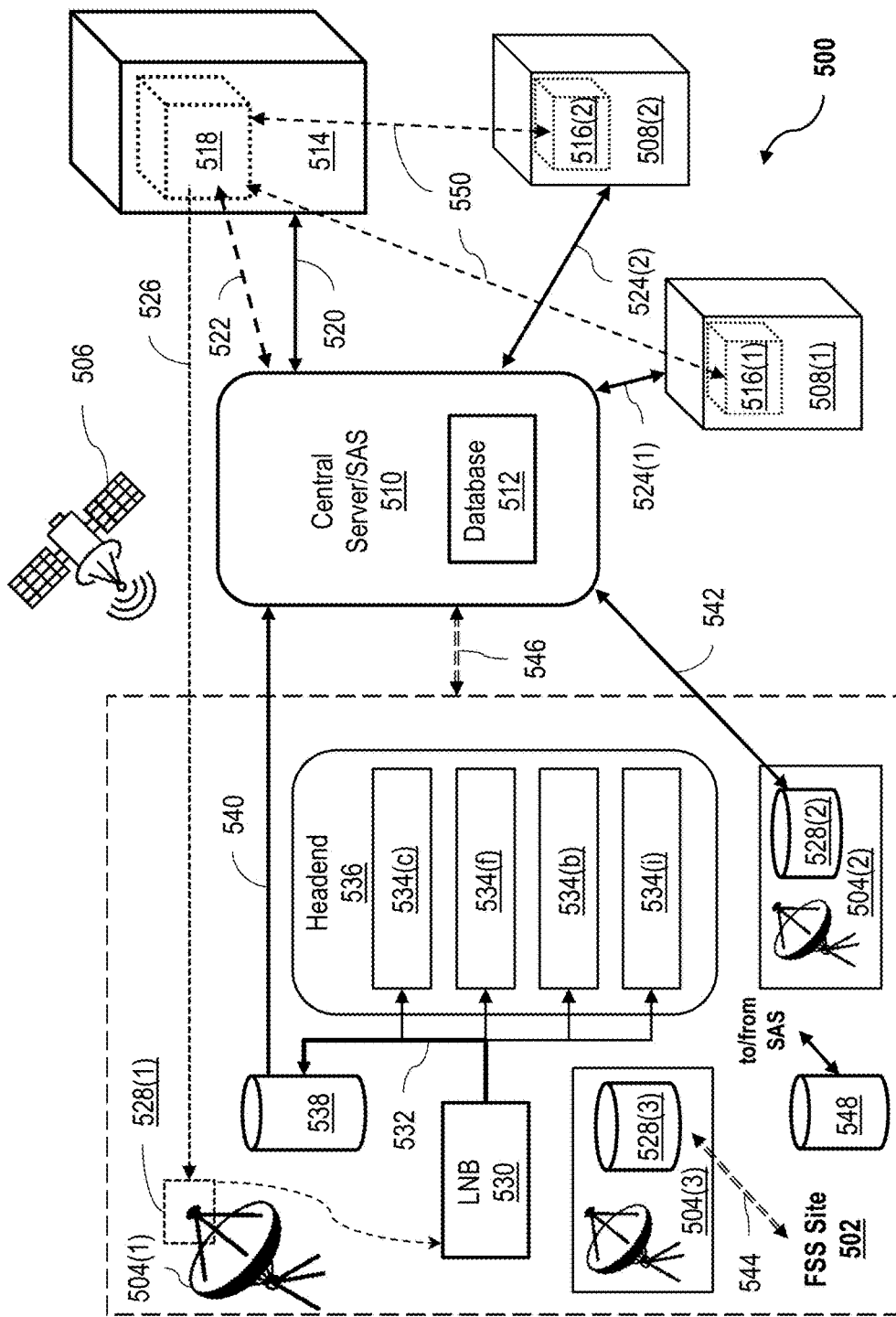
FIG. 5 is a schematic illustration of a satellite service protection system implementing the scheme depicted in FIG. 4, according to an embodiment.

FIG. 5 is a schematic illustration of a satellite service protection system 500 implementing protection scheme 400, FIG. 4, and similar components between system 500 and scheme 400 function in a similar manner to one another. In an exemplary embodiment, system 500 includes an FSS site 502 having a plurality of earth stations 504. In this example, FSS site 502 is a registered site. Each earth station 504 includes a dish and a frequency agile receiver (not numbered), for receiving and decoding video/data streams from a satellite 506. System 500 further includes at least one or more existing APs 508 that have been authorized by, and are under the management and control of, a central server 510 having a centralized database 512. Central server 510 may include, or be, an SAS. System 500 further includes a new AP 514 seeking authorization from central server 510 (e.g., under PAL or GAA terms).

In the exemplary embodiment, each existing AP 508 includes at least one existing beacon transmitter 516 as an integral component or function thereof. In other embodiments, existing beacon transmitters 516 may be separate and distinct components from corresponding existing APs 508. Similarly, new AP 514 includes a new beacon transmitter 518 as an integral component or function of thereof (as illustrated), or as a separate and distinct element. New AP 514 is in operable communication with central server 510 over new AP data link 520. In some embodiments, new beacon transmitter 518 is in operable communication with central server 510 over a separate beacon data link 522. In other embodiments, the beacon transmitter and the AP communicate with central server 510 over a single data link, as illustrated with respect to existing AP data links 524 for APs 508. In the exemplary embodiment, each of beacon transmitters 516, 518 may include a transceiver (not shown), separate transmitting and receiving components, and/or an omnidirectional antenna. For ease of explanation, individual user equipment (UEs) that may be associated with APs 508, 514 are not shown.

New beacon transmitter 518 is configured to transmit a direct beacon signal 526 for reception by one or more beacon detectors 528 at FSS site 502. In the exemplary embodiment, FSS site 502 includes at least one beacon detector 528 for each earth station 504, and in close proximity to the respective earth station. In an alternative embodiment, FSS site 502 includes a single beacon detector 528 for a plurality of earth stations 504. In this alternative embodiment, the distance between the single beacon detector 528 and each individual earth station 504 is known, and recorded in central database 512. A model for the FSS is built so that the single beacon detector can model the interference to each individual dish based on its operating parameters. Beacon detectors 528 may be located indoors or outdoors, and may be integral to the structure of a particular earth station 504 (e.g., earth station 504(1) and beacon detector 528(1)), or separate components (e.g., earth station 504(2)/beacon detector 528(3), 504(3)/beacon detector 528(3)).

More specifically, in the example where beacon detector 528(1) is an integral portion of earth station 504(1), beacon detector 528(1) utilizes LNB 530 as the effective receiving portion of the beacon signal received by the dish. That is, the dish of earth station 504(1) detects direct beacon signal 526 from beacon transmitter 518 along with the transmit spectrum from satellite 506. LNB 530 demodulates direct beacon signal 526 along with the received transmit spectrum (not shown in FIG. 5), and distributes the demodulated beacon signal, according to an exemplary embodiment, along a distribution chain 532 to a rack of receivers 534 in a headend 536, to reach a reporter 538. In an exemplary embodiment, reporter 538 is configured to filter and process the demodulated beacon signal, and then report it to central server 510 over a first beacon measurement reporting link 540. In an embodiment, first beacon measurement reporting link 540 is a wired or wireless data link, or may be an RF communication. Thus, in this example, beacon detector 528(1) utilizes reporter 538 effectively as the transmitting portion for the beacon measurement.

In the exemplary embodiment, the MBP scheme further configures beacon detector 528 such that a determination may be made if the aggregate signal level at the LNB input is greater than −60 dBm. In at least one embodiment, this determination is based on summing the individual measurements of each transmitter within, for example, a 40 km radius of FSS site 502. Beacon detection within system 500 is further configured such that the system may further monitor (e.g., within FSS site 502, or externally by central server 510) the current, output level, output linearity, and level of known input signal of the LNB. System 500 is further configured to measure noise level at the output of the feed horn (or filter unit) of the LNB, or alternatively, the carrier-to-noise ratio (CNR), the bit error ratio (BER), and/or another metric downstream of the LNB that indicates noise floor impairment. In some embodiments, system 500 is further configured to determine degradation of the noise floor at the intermediate frequencies, and/or degradation of receiver metrics that are attributable to the AP. For the CBRS band, having −129 dBm/MHz as the expected protection level, −10 dB I/N may be sought as the noise target. For other bands, a different noise target may be sought.

The integrated configuration of beacon detector 528(1) is particularly advantageous to FSS sites having one or few earth stations, where additional hardware costs (e.g., additional antenna/transceiver for each dish) might not be cost-prohibitive, or in the case where other considerations would render multiple external antennas to be undesirable. Additional LNBs only marginally add to the hardware cost of an earth station, and many earth stations often include multiple LNBs for a single dish. The present embodiments therefore advantageously utilize one or more of the relatively less-expensive LNBs for beacon detection. According to this exemplary embodiment, system 500 is able to tap into each FSS antenna signal distribution chain downstream of the LNB, and receive the beacon at the downconverted intermediate frequency (IF) frequency of the in-band beacon signal. According to this advantageous technique, the central server is able to avoid adjusting the beacon RSSI for the FSS dish antenna gain, since the beacon signal is received utilizing the FSS dish itself.

The implementation of integrated beacon detector 528(1) provides the further advantage of enabling earth station 504(1) to detect interference in exactly the way that the interference will be affecting the earth station. In other words, any measured value at the reporter 538 will exactly represent the value of the signal causing the interference. In an exemplary embodiment, for narrowband signal, the integral beacon detector 528(1) further includes a sufficiently stable clock for each such integral detector, to realize a more efficient detection.

In some instances, and particularly for a narrow band signal, the frequency stability of the oscillator used in the down conversion process in the LNB may be sufficient for a video signal, but may not by itself sufficiently stabilize the position of a beacon signal. Accordingly, in some embodiments, the local oscillator frequency used for down conversion may synchronize, for example, a GPS signal, such that the beacon signal is stabilized in order to speed the efficiency in which an auto-correlation can be performed. In other configurations of the beacon detectors described herein, an additional clock (frequency) is not required for efficient functionality.

In the example where detection is performed by a component separate from the earth station, beacon detector 528 is an external antenna. In some embodiments, FSS site 502 includes up to one such external antenna for each earth station 504. In other embodiments, FSS site 502 includes a single external antenna for a plurality of earth stations 504 at the single FSS site. In the case where beacon detector 528 is an external antenna located in close proximity to earth station 504, the beacon measurement reporting to central server 510 may be direct or indirect. More specifically, beacon detector 528(2) communicates directly with central server 510 over a second beacon measurement reporting link 542. In contrast, beacon detector 528(3) communicates first to a central processor (not shown) of FSS site 502 over an internal site reporting link 544, and FSS site 502 communicates directly with central server 510 over a site status reporting link 546. In the exemplary embodiment, FSS site 502 communicates additional site-related information, including per-dish frequency usage, direction of alignment and elevation, dish size, GPS co-ordinates, etc., to central server 510 over site status reporting link 546.

This site related information, such as direction of alignment and elevation, can be provided dynamically to central server 510 by measuring devices (not shown) attached to each dish, and particularly for instances when the dishes are aligned to different satellites frequently. Alternatively, for dishes that are never moved once they are aligned, a database registration process (e.g., within central database 512) could be used which does not need the expense of separate dynamically reporting measuring devices. In at least one embodiment, the satellite measuring device includes a digital compass and/or an elevation angle-measuring component. In another embodiment, the measurement device is similar to a computer-controlled measuring device for a telescope.

Figure 2:
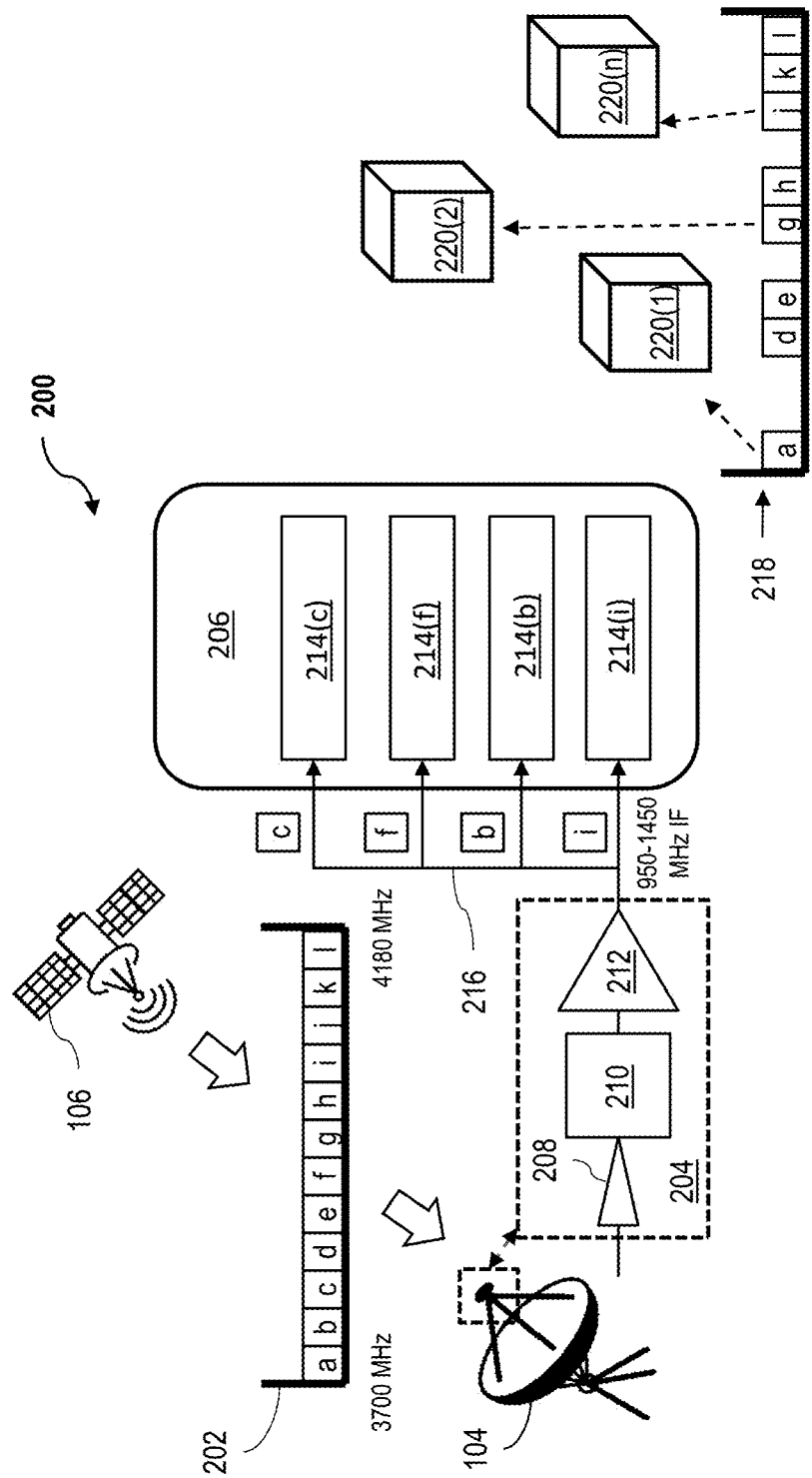
FIG. 2 is a schematic illustration of a conventional satellite service protection system implementing the scheme depicted in FIG. 1.

According to the exemplary embodiments illustrated in FIG. 5, central server 510 is capable of unlocking, for new AP 514, bandwidth that is unused by existing APs 516 (e.g., unused transmit spectrum portion 218, FIG. 2), thereby significantly increasing the spectrum utilization of the band. That is, as described above, not all of the twelve 40 MHz channels in the transmit spectrum will actually be demodulated by every dish receiver distribution chain at every FSS site. System 500 thus advantageously protects the "used" channels at the appropriate level of co-channel protection, and assigns the conventionally "unused" spectrum to a new AP. In the exemplary embodiment, central server 510 further calculates blocking and noise levels to prevent degradation of FSS receivers, using the empirical information obtained by the MBP scheme.

Furthermore, in addition to the improved spectrum utilization, systems and methods according to the protection schemes described herein further achieve advantageous reductions to the geographic size of the protection zone around an FSS site. That is, under current FCC protection schemes, an FSS site may be required to have a 150 km radius co-ordination zone with formal written applications and studies carried out on each transmitter application against very conservative criteria. According to the principles of the present embodiments though, the FCC protection rules may be successfully changed to reduce the required radius of the protection zone immediately about the FSS site, and may further create outwardly-expanding geo-tiers of protection around new reduced protection radius. For example, as described herein, an immediate first protection zone around and FSS site may be set to a 150 m radius. A second geo-tier zone, outside of the first protection zone, may be set to a 320 m radius for small cell use, and for operation within 280 MHz at 4 W transmitter power. A third geo-tier zone, outside of the second geo-tier zone, could then be set to a 780 m radius, and for operation within, for example, 500 MHz at 4 watts. Beyond 780 m, higher powers are available. These tiers may be further modified according to particular system specifications.

In the case where FSS site 502 includes a single beacon detector 528 for a plurality of earth stations 504, the single beacon detector 528 may further implement multiple-input/multiple-output (MIMO) technology to effectively increase the gain and extended the range of system 500 and the protection scheme. In this example, a single beacon detection antenna may provide greater system visibility around the environment, and may also represent a lower hardware cost outlay for an FSS site having a large number of earth stations. Further to this example, because received interference will affect different earth stations in different ways, each of the plurality of earth stations 504 may further be calibrated to the single antenna such that central server 510 is rendered capable of determining the effect of the interference on a specific earth station 504, and then utilize the unique ID from the interfering source to remedy the interference. Optionally, FSS site 502 includes at least one distributed detector 548 in addition to one or more beacon detectors 528.

In an embodiment, beacon transmitters 516 are transceivers, and are further configured to detect a direct beginning signal 526 over respective RF paths 550, and report such measurement information to central server 510 over links 524. Accordingly, by utilizing individual beacon transmitters for the dual-purpose functionality of transmission and detection, system 500 is rendered capable of significantly increasing amount of real-time information that can be used to measure, manage, and remedy interference for a particular FSS site. This capability is particularly advantageous in the case where FSS sites are not densely populated (and thus potentially fewer available beacon detectors), but APs seeking to utilize the transmit spectrum are more numerous. The APs themselves thus perform a level of self-policing among a community of APs.

In an exemplary embodiment, such beacon transceivers can be implemented in either the hardware or the software of an eNodeB or AP, or may constitute a separate device having a separate antenna, or utilizing a base station antenna. In some embodiments, transmission of the beacon signal may be periodic, on-demand, or according to programming. Where the beacon signal is managed according to a program, in at least one embodiment, program may include instructions to terminate the beacon transmission once the eNodeB or AP has been authorized by the central server, but continue to allow beacon detection as desired. The beacon transmission program may be stored in a central database 512 and run by central server 510, or may be executed at the AP level. In some embodiments, central database 512 further includes data regarding the frequency of satellite 506, one or more frequencies actually received by earth stations 504, as well as the direction of orientation and elevation of the earth station dish(es). All such information may be used to calculate initial resource allocations, as well as empirical interference management by central server 510.

Figure 6:
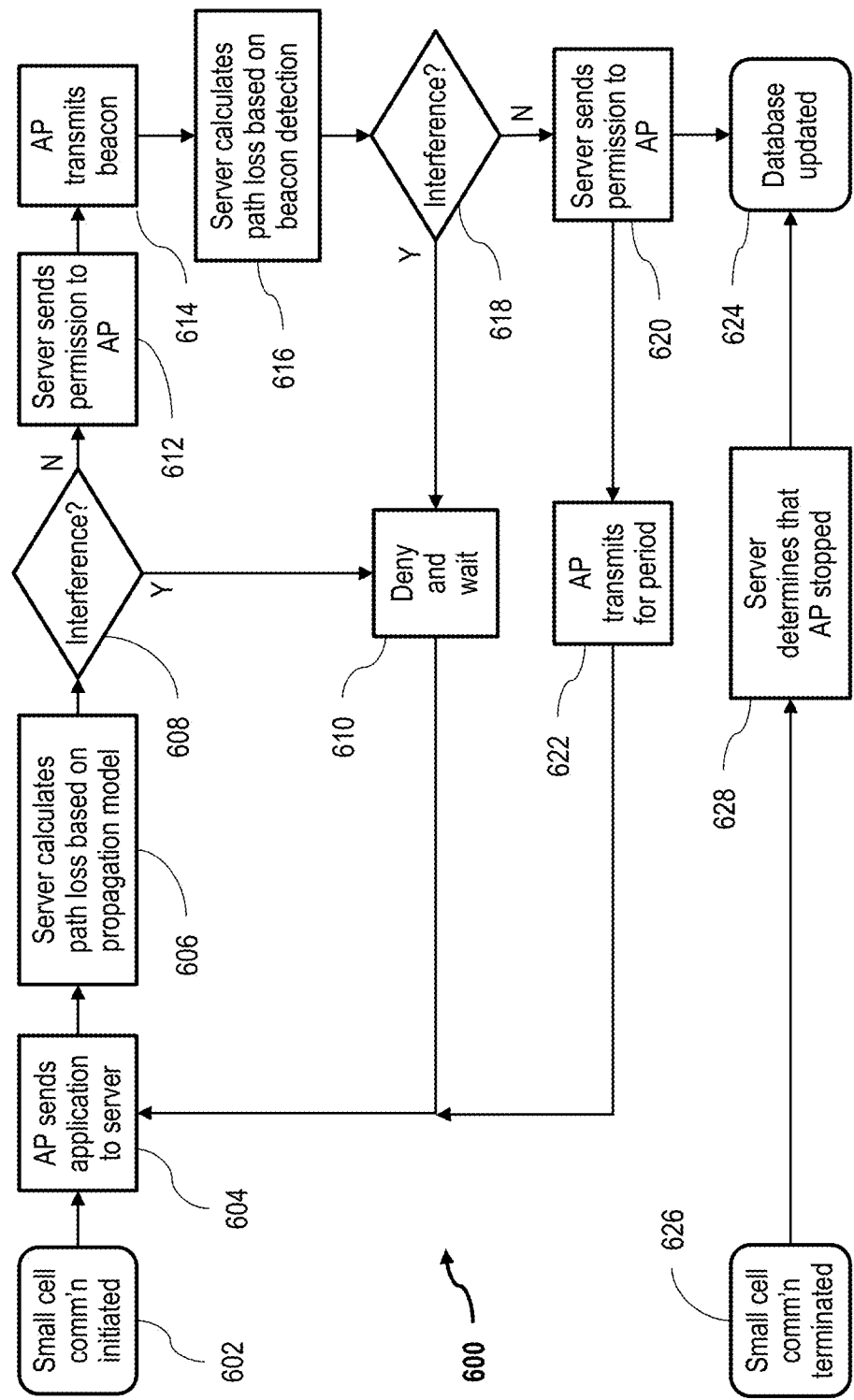
FIG. 6 is a flow diagram for an exemplary process for operating the satellite service protection system depicted in FIG. 5, according to an embodiment.

FIG. 6 is a flow diagram for an exemplary process 600 for operating satellite service protection system 500, FIG. 5. In operation, process 600 begins at step 602, in which small cell communication is initiated by an AP. In one example of step 602, new AP 514 is a small cell access point that initiates communication by one or more of powering up, restarting, wakening from a sleep mode, etc. In step 604, AP 514 submits an authorization application to central server 510, including one or more of a unique small cell identification code, location coordinates, a requested maximum power from the whole small cell, minimum power level(s) for effective operation, a requested frequency channel or channels, elevation, antenna and/or MIMO status, whether the AP use is indoor or outdoor, and an estimated maximal user number. In the exemplary embodiment, AP 514 communicates submitted information over a wired Internet connection. In an alternative embodiment, AP 514 communicates submitted information over the air by an agreed signaling channel.

In step 606, central server 510 calculates a path loss based on a propagation model using the information submitted from AP 514 in step 604. In at least one example of step 606, central server 510 further utilizes information previously stored in a central database 512 to calculate the path loss. Once the initial path loss is calculated, process 600 proceeds to step 608. Step 608 is a decision step. In step 608, process 600 determines, based on the calculations from step 606, whether unavoidable interference would result at any FSS earth station from the operation of AP 514. That is, in step 608, central server 510 determines whether there is a feasible channel and power level at which AP 514 may provide effective coverage for small cell users and, at the same time, will not cause interference to FSS site 502. In at least one example of step 608, the criteria for this interference determination may vary depending on the frequency of operation, the aggregate background noise level contribution, the number and distances of APs, etc.

If, in step 608, process 600 determines that interference will occur, process 600 proceeds to step 610. In step 610, central server 510 rejects the application from AP 514. In further operation of step 610, AP 514 waits for a time period and then returns to step 604, where AP 514 submits a new application to central server 510, including timely updated small cell information, or central server 510 informs AP 514 of a change in conditions.

If, however, in step 608, process 600 determines that interference will not occur, process 600 proceeds to step 612. That is, process 600 determines that no interference occurs when central server 510 calculates the existence of a maximum power level and a frequency channel for AP 514 that will ensure both feasible and interference-free small cell communication. In step 612, central server 510 sends permission to AP 514, including the approved frequency channel, the approved maximum power, and other relevant operational information. The approved frequency channel/maximum power sent by central server 510 is the same or different from the channel/power originally requested by AP 514, based on calculations by central server 510 regarding the available spectrum and/or measured empirical information that updates the initial propagation model. In step 614, AP 514 transmits a beacon having a central frequency derived from the approved frequency channel sent in step 612. In at least one example of step 614, the power level of the beacon is also derived from, but will be significantly lower than, the approved maximum power sent in step 612. In an alternative operation, AP 514 transmits the beacon in an adjacent guard band.

In step 616, central server 510 collects data from one or more beacon detectors 528, including one or more of the received beacon power, the detector coordinates, etc., and calculates a measurement-based path loss based on the collected data. In the exemplary embodiment, the beacon data is additionally collected from beacon transmitters 516 with beacon receiving functions, distributed sensing locations, or other in-range detection equipment that is communicatively coupled to central server 510. In some instances, where the beacon cannot be detected by one or more desired beacon detectors, central server 510 may use the data collected from the other detector/sensing locations. In at least one example of step 616, central server 510 prioritize the collected beacon data according to the location of the detector (e.g., distance of a detector from a transmitter may be considered as a factor) and/or the reliability of the particular detection component (e.g., not all transmitters and detectors will be of the same known quality). Once the path loss is calculated, process 600 proceeds to step 618.

Step 618 is a decision step, and operates similarly to step 608. That is, in step 618, based on the calculated path loss from step 616, central server 510 determines whether unavoidable interference may occur at any FSS earth station(s) if AP 514 operates at the frequency channel that was approved for beacon transmission, or in a guard band. That is, in step 618, central server 510 determines whether there is a power value at which AP 514 can provide effective coverage for particular UEs and, at the same time, will not cause interference to particular FSS sites 502. If unavoidable interference is foreseen, process 600 returns to step 610. If the central server 510 determines that there exists a maximum power value that will guarantee feasible and interference-free AP communication, process 600 proceeds to step 620.

In step 620, central server 510 sends permission to AP 514 with detailed information including an approved maximum power and an allocated frequency. Similar to step 612, based on calculations by central server 510, the approved maximum power and/or the allocated frequency in step 620 may be different from either or both of the request powers/frequencies from application step 604 or approval step 612. Process 600 then proceeds to step 622 in which AP 514 begins small cell communication at the approved frequency channel (e.g., from step 612 or step 620) and approved maximum power level (e.g., from step 620), and continues the small cell communication for a communication period. After the communication period, process 600 returns to step 604, where AP 514 submits an application for revalidation, including updated information (e.g., the number of small cell users associated with AP 514).

Referring back to step 620, process 600 also proceeds to step 624, in which central server 510 updates its propagation model based on collected measurement data from beacon detectors 528, beacon transmitters 516, and other detection components in the system, if any.

In step 626, small cell communication from AP 514 is terminated. Step 626 occurs, for example, when AP 514 is placed into sleep mode, powered off (e.g., without sending an acknowledgement in time to central server 510), or otherwise rendered non-operational. In various circumstances, step 626 may occur at any time in process 600 after step 602. Upon termination of small cell communication from AP 514, process 600 proceeds to step 628, in which central server 510 determines that AP 514 has ceased communication and any radiation/transmission at the protected band. Process 600 then proceeds to step 624.

Process 600 is therefore particularly applicable to MBP schemes for FSS sites in the CBRS band and devices (e.g., CBSDs, APs, UEs, etc.) sharing the 3.55-4.2 GHz spectrum, as well as other bands where sharing radio resources is centrally enforced based on the interference contribution of individual transmitters and a spectrum sharing strategy. Furthermore, process 600 may add additional steps to those described above, or in some circumstances, omit particular steps that may become redundant or unnecessary in light of other conditions, or may be performed in a different order. Additionally, process 600 may further adopt one or more of the following considerations.

In some embodiments, central server 510 is configured to determine if AP 514 is within the required protection distance from any registered FSS sites, or within the coordination distance of existing APs. If AP 514 is within the protection or coordination distance, central server 510 may instruct AP 514 to activate its beacon transmitter 518. In some embodiments, as described above, beacon transmitter 518 may communicate directly with central server 510, and outside of the immediate control of AP 514. That is, even in the case where the components are integral, AP 514 and beacon transmitter 518 need not directly communicate with one another. In such circumstances, the beacon link 522 and the AP data link 520 to central server 510 may be separate and independent from one another.

In other optional features of system 500 and process 600, central server 510 may be configured to pass the unique ID code to beacon transmitter 518 for transmission over the air on a particular beacon frequency, and beacon transmitter 518 may begin transmission using this ID code, assigned by central server 510, in its data payload. In an embodiment, the data payload may include one or more of the unique ID, the location of beacon transmitter 518/AP 514, and the transmit power. In at least one embodiment, the data payload further includes information related to UE utilization, as well as means to migrate interference of a UE to a satellite disk. For example, when a UE is determined to be too close in proximity to a protected FSS site 502, central server 510 may instruct the UE to change its frequency out of the protected band. Additionally, in the exclusion zones around and FSS site where any transmission is considered to cause interference, the UE may be instructed, with coordination by the mobile core, to operate in another frequency band (e.g., 900 MHz).

In some embodiments, APs 508, 514 are further configured to directly or indirectly communicate information between one another about individual UEs associated with that respective AP. In at least one embodiment, according to particular operational conditions, such communication occurs over fixed network to reduce the payload of the beacon and maintain a maximum link budget.

In some embodiments, central server 510 is optionally configured to proactively contact beacon detectors 528 that are within a protection distance, and inform the receivers thereof to report any beacon IDs received during an assigned measurement. In some instances, central server 510 may be optionally configured to directly contact selected beacon transceivers at a known nearby existing AP 508, as needed for GAA/PAL protection calculations, to initiate measurement of beacon signal 526 from new beacon transmitter 518. The number of beacon detectors 528 disposed at an FSS site 502 is optional, and may be based on morphology, clutter, and expected propagation conditions. Similarly, the height of the particular antenna, as well as its gain, may be assigned at the discretion of the operator. In some embodiments, a particular unique beacon ID may not be known to an FSS (e.g., where it may be desired to protect the integrity of the beacon measurement scheme), but will be stored in central database 512 for confirmation by central server 510 where necessary.

In some embodiments, central server 510 may also be configured (e.g., through software programming or hardware components) to query a management system/processor (if known and/or present) of an FSS site to update information in central database 512 regarding bandwidth usage, antenna azimuth, elevation angle receiving schedule, noise measurements, etc. Similarly, beacon detectors 528 may be programmed (or may be responsive to control by a program from another component) to automatically report to central server 510, upon detection of any beacon ID, the received beacon ID, the RSSI, and/or the SNR. Optionally, central server 510 may be further programmed to wait for a timeout, and note if an FSS site 502 has identified the beacon ID assigned to new AP 514 during a measurement period, and then update the FSS site parameters in central database 512 if such beacon information has been received.

In some embodiments, central server 510 is further programmed to calculate the path loss between each AP 508, 514 and each FSS site 5024 each beacon detector 528, and compute the potential for interference to each FSS site dish antenna. Such calculations may further consider the received RSSI values, antenna azimuths, and gain patterns at both the respective FSS sites and the APs, and further take into account the computed path loss between the AP and FSS site locations based on the discrete and continual beacon measurements. Central server 510 may still further be configured to calculate the path loss between new AP 514 and existing APs 508, and calculate the potential for interference by new AP 514 to each existing AP 508. In this example, such calculations may further consider antenna parameters, FSS site parameters, and the computed path loss between AP's based on real-time beacon measurements.

In all of the examples described above, central server 510 is configured to utilize the results of the beacon measurements, as well as updates from the FSS site parameters, to continually monitor the operating parameters for AP (and also UE) communication with respect to one or more FSS sites. Such operating parameters include, without limitation, the power levels, antenna gain/orientations, and transmit frequency.

The systems and methods described herein therefore realize significant advantages over the conventional protection schemes by allowing for the determination of the actual path loss between an AP/CBSD and an FSS site, and also the loss from AP/CBSD to AP/CBSD. The present embodiments thus achieve in-band beacon transmission-to-detection with greater than a 180 dB link budget. According to the present embodiments, measurement of third party signals by an AP (e.g., from known transmitters in the direction of the FSS site or other APs) further allows a significantly improved capability to estimate in-building loss and path loss distance-based exponents, as well as means for remedying interference. In at least one embodiment, a plurality of central servers are networked together to share information and complete tasks. In this example, the plurality of central servers may be supplied by different companies and/or operators, work and communicate together in a cloud-like network, and/or assign one central server as a master server to manage other central servers.

The present systems and methods further allow for the determination of the individual interference contribution from each identified transmitter. In some embodiments, the individual interference contribution may be determined using formats for narrow band beacons and reporting, such as weak signal propagation reporting (WSPR), for example, in order to determine path loss within the gain profile of the satellite aperture. The central server is able to prioritize and control AP transmitter parameters to reduce the overall transmitter contributions such that they fall below the noise floor, and/or a particular desired noise target for all the key interference thresholds. According to these advantageous capabilities, other transmitters outside of the aperture can be successfully de-prioritized, multipath contributions can be recognized and controlled, and overall noise optimization can be obtained.

According to the present embodiments, further advantages may be realized with respect to mobile device management. For example, UEs associated with an AP/CBSD may contribute interference to an FSS site, even at relatively low transmitter power. Under the protection schemes and systems herein though, UEs may themselves deploy a beacon signal manner similar to that described above with respect to the APs, and thus more effectively report their association with a particular AP/CBSD, and hence the UE location (from the UE beacon or directly from the AP) to the central server/SAS. Accordingly, the actual path loss associated with each UE may be determined, and thus the level of interference from that UE. If the interference from a particular UE is determined to exceed a chosen threshold, the AP may cause the UE to move to another band, such as the macro-cell which uses a different frequency band to the satellite system and does not cause any interference.

The systems and methods herein further advantageously provide FSS site monitoring and reporting to the central server of real-time channel usage at each FSS receiver/dish pairing. Under these techniques, receiver frequency assignment can be fixed or dynamic, depending on satellite and FSS customer needs, and such assignments may be continually tracked by the central server to prevent interference by CBRS or other interfering devices. FSS receiver bandwidth may therefore be automatically detected, or alternatively, manually input if desired.

When the actual received bandwidth is known at each location and signaled to the central server, the full 500 MHz transmit band will not need 180 dB of co-channel protection from the CBRS fundamental emission. Instead, as little as 104 dB of protection may be adequate to protect FSS to the FCC-mandated level, such as for the second adjacent band. Furthermore, the multi-protocol receiver may be installed at FSS dish to identify CBSD signal sources and report RSSI and identification data to central server.

As described herein, the central server is configured to act to not only approve applications to transmit, but also to monitor, measure, manage active participants, and further to remedy potential and actual interference. The central server of the present systems and methods thus acts upon bandwidth usage reporting by the FSS sites and the measurement-based protection scheme system. Measurements by beacon receivers, multi-protocol receivers, FSS satellite program receivers, other APs/beacon transmitters, and even UEs, are reported to directly or indirectly to the central server to determine one or more of: (i) path loss between the FSS site and the AP/CBSD; (ii) path loss between the FSS site and a UE associated with the AP/CBSD (e.g., with location information); (iii) path loss between a new AP/CBSD and one or more existing APs/CBSDs; (iv) impairment of the FSS noise floor; (v) degradation of FSS receiver performance; (vi) the identify of a particular AP/CBSD that is raising the noise floor at a specific frequency and for a particular FSS site dish; (vii) any interference caused by a UE in close proximity to the FSS site; and (viii) interference from the aggregation of transmitters across the whole satellite band that impacts on the linearity of the LNB.

According to the present embodiments, central server is still further configured to take one or more of the following remedial measures to mitigate interference and migrate the source of interference to a non-interfering communication status: (i) collect input information and determine appropriate actions to take regarding interfering APs/CBSDs/UEs; (ii) issue commands to AP/CBSD to modify operating parameters (e.g., transmit power, operating frequency/bandwidth, antenna pointing angle or direction, etc.) of new and existing APs/CBSDs based on FCC rules, equitable resource allocation calculations, changes to RF propagation, etc.; (iii) issue commands to specific UEs (in conjunction with an associated mobile network or other networks) to modify operating parameters, including changing channel of operation (e.g., in the case of a mobile network, to that of the macro-cell that is in a different band to the FSS site); (iv) continually monitor the operation of an initialized AP/CBSD over time for changes in propagation conditions and other factors could change the interference environment; (v) regularly monitor status reports from FSS receivers and/or master scheduler regarding bandwidth utilization at each site, and recalculate resource allocation values using this updated information; and (vi) modify frequency assignments of existing APs/CBSDs in an impact area of FSS site according to changes in FSS frequency usage.

A person of ordinary skill in the art, upon reading and comprehending this written description and accompanying drawings, will understand the applicability of the present embodiments beyond the specific examples described herein. For example, the principles of spectrum sharing in the C-band and CBRS band may be applied to protection schemes in other bands, and particularly to the "6 GHz" bands, namely, the 5.925-6.425 GHz and the 6.425-7.125 GHz bands, which are presently utilized for satellite uplinks. The present inventors further envision implementing the advantageous beacon detection systems in a "stoplight" system for governing the deployment and operation of particular beacon detectors.

The principles of the systems and methods described herein may be further adapted to: massive MIMO transmissions, utilizing beamforming at the AP/mobile base station to reduce interference to satellite systems; beacon formatting and transmission schemes to allow for gradual power increases to the beacon; extending the effective detection range of an individual beacon beyond a 2.4-5 km limit for an individual site, where a network of widely deployed beacons may be directly or indirectly reported back to a central server, and particularly across populated areas; include on-site geo-distributed antenna arrays to reduce inaccuracies caused by multipath transmissions; computer programs and models to further refine the collection of real-time empirical data and more accurately manage spectrum sharing and re-use across a range of transmission bands; and technology upgrades to AP devices to include their own beacon detectors to better systematically link with FSS sites and other APs for more accurate path loss estimates and more secure protection.

The advantageous closed-loop configuration of the present embodiments therefore provides significant versatility in the implementation of protection schemes utilizing the disclosed beacon detection techniques. That is, interference is effectively eliminated irrespective of whether a spread spectrum is utilized, or a narrowband transmitter. Beacon detectors may be deployed as integral components of the satellite dish, or as separate antennas, but neither deployment will create interference to the satellite dish itself. The present techniques create a self-organizing and self-policing network of beacon detection components that avoids the need for overprotective safety margins, while unlocking significant—and previously unavailable—portions of the transmit spectrum for further usage, such as by mobile devices.

Exemplary embodiments of spectrum sharing management systems and methods are described above in detail, as well as particular embodiments relating to beacon transmission and detection. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for protecting a fixed satellite service site, comprising:
   at least one earth station;
   a first beacon detector disposed within close proximity to the at least one earth station;
   a central server in operable communication with the fixed satellite service site and the first beacon detector;
   an access point configured to request authorization from the central server for resource allocation; and
   a beacon transmitter disposed within close proximity to the access point, and configured to transmit a beacon signal to one or more of the central server and the first beacon detector, wherein the beacon signal uniquely identifies the access point.

2. The system of claim 1, wherein beacon transmitter is integral to the access point.

3. The system of claim 1, wherein the first beacon detector is integral to the at least one earth station.

4. The system of claim 3, wherein the first beacon detector comprises a receiving portion and a transmitting portion.

5. The system of claim 4, wherein the at least one earth station includes a satellite dish and a frequency agile receiver having at least one low noise block, and wherein the beacon detector receiving portion comprises the at least one low noise block.

6. The system of claim 5, wherein the beacon detector transmitting portion comprises a reporter component configured to receive a demodulated beacon signal output from the at least one low noise block and transmit the received demodulated output beacon signal to the central server.

7. The system of claim 1, wherein the first beacon detector comprises an external antenna and a transceiver.

8. The system of claim 1, wherein the central server comprises a spectrum access system and a central database.

9. The system of claim 1, wherein the central server comprises a plurality of central servers.

10. The system of claim 9, wherein the plurality of central servers collectively share tasks and communicate in a cloud-based network.

11. The system of claim 9, wherein a particular one of the plurality of central servers is a master server managing others of the plurality of central servers.

12. The system of claim 1, the beacon signal includes a received signal strength indication and a unique identifier of the access point.

13. The system of claim 1, wherein the beacon transmitter comprises a second beacon detector configured to receive a different beacon signal from a different access point and report the received different beacon signal to the central server.

14. The system of claim 1, wherein the first beacon detector comprises a distributed receiver.

15. The system of claim 1, wherein the fixed satellite service site includes a third beacon detector comprising a distributed receiver.

16. The system of claim 1, wherein the access point is configured to implement small cell communication.

17. The system of claim 1, further comprising a plurality of user equipment devices associated with the access point.

18. The system of claim 1, wherein the central server is further configured to manage the plurality of user equipment devices using information included in the beacon signal regarding individual ones of the plurality of user equipment devices.

19. The system of claim 1, wherein the central server is further configured to dynamically receive site-related information from the fixed satellite service site including one or more of per-dish frequency usage, direction of alignment, elevation, dish size, GPS coordinates, bandwidth usage, antenna azimuth, elevation angle, receiving schedule, and noise measurements.

20. The system of claim 19, wherein one or more of the direction of alignment, the elevation, the antenna azimuth, and the elevation angle are dynamically obtained by a measuring device disposed with the at least one earth station.

21. The system of claim 1, wherein the first beacon detector comprises a plurality of distributed beacon detectors to extend a link budget of the system.

22. The system of claim 1, wherein the system is configured to measure interference and utilize spectrum portions for priority access license and general authorized access license sub-bands in the citizens band radio service.

23. A method for authorizing an access point to operate within a spectrum occupied by a fixed satellite service site, the method comprising the steps of:
   receiving, over a communication channel, an application from the access point for operation within the spectrum;
   calculating a path loss based on the application from the access point;
   determining that interference will be caused by transmission of the access point at a first frequency and a first power level;
   instructing the access point to transmit a beacon signal to one or more beacon detectors within range of the access point;
   measuring a path loss between the access point and the fixed satellite service site based on reported information from the one or more beacon detectors;
   assigning to the access point, based on the measured path loss, a second frequency within the spectrum and a second power level that do not cause substantial interference to the fixed satellite service site; and
   authorizing the access point to operate at the second frequency and the second power level.

24. The method of claim 23, wherein the first frequency and the first power level are requested by the access point in the application.

25. The method of claim 23, wherein the second frequency is different from the first frequency, and wherein the second power level is different from the first power level.

26. The method of claim 23, wherein the second frequency is the same as the first frequency, and wherein the second power level is lower than the first power level.

27. The method of claim 23, further comprising, after the step of measuring, a step of monitoring operating parameters and a site status of the fixed satellite service site, and reporting to the access point a change in conditions to at least one of the operating parameters and the site status that will allow the access point to operate at the first frequency and the first power level.

28. The method of claim 27, further comprising, after the step of authorizing, a step of controlling the access point to change one or more of the second frequency and the second power level based on new beacon detector information obtained during the step of monitoring.

29. The method of claim 23, wherein the spectrum comprises the CBRS band.

30. The method of claim 23, wherein the spectrum comprises the C-band.

* * * * *